(12) United States Patent
Weber et al.

(10) Patent No.: US 8,473,501 B2
(45) Date of Patent: Jun. 25, 2013

(54) METHODS, COMPUTER SYSTEMS, SOFTWARE AND STORAGE MEDIA FOR HANDLING MANY DATA ELEMENTS FOR SEARCH AND ANNOTATION

(75) Inventors: Lutz Weber, Germering (DE); Timo Bohme, Markkleeberg (DE)

(73) Assignee: OntoChem GmbH, Halle/Salle (DE)

( * ) Notice: Subject to any disclaimer, the term of this patent is extended or adjusted under 35 U.S.C. 154(b) by 0 days.

(21) Appl. No.: 12/862,184

(22) Filed: Aug. 24, 2010

(65) Prior Publication Data
US 2011/0055233 A1    Mar. 3, 2011

(30) Foreign Application Priority Data

Aug. 25, 2009    (EP) ..................................... 09010882

(51) Int. Cl.
*G06F 17/30*    (2006.01)
(52) U.S. Cl.
USPC ............................ 707/752; 707/769; 711/154
(58) Field of Classification Search
USPC ................... 707/752, 769; 711/170, 220, 154
See application file for complete search history.

(56) References Cited

U.S. PATENT DOCUMENTS

| | | | | |
|---|---|---|---|---|
| 5,594,903 A * | 1/1997 | Bunnell et al. | ................ | 717/162 |
| 6,029,170 A * | 2/2000 | Garger et al. | ......................... | 1/1 |
| 6,381,735 B1 * | 4/2002 | Hunt | ............... | 717/158 |
| 6,490,592 B1 * | 12/2002 | St. Denis et al. | ...................... | 1/1 |
| 6,957,422 B2 * | 10/2005 | Hunt | .............. | 717/130 |
| 7,171,537 B1 * | 1/2007 | Moir et al. | .................... | 711/170 |
| 7,287,026 B2 * | 10/2007 | Oommen | ............................. | 1/1 |
| 7,478,109 B1 * | 1/2009 | Panigrahy et al. | .................... | 1/1 |
| 7,502,906 B2 * | 3/2009 | Moir et al. | .................... | 711/170 |
| 8,065,476 B2 * | 11/2011 | Cheriton | ...................... | 711/108 |
| 8,301,631 B2 * | 10/2012 | Chow | ........................... | 707/738 |
| 2002/0072830 A1 * | 6/2002 | Hunt | ............................... | 701/1 |
| 2003/0195890 A1 * | 10/2003 | Oommen | ...................... | 707/100 |
| 2008/0183958 A1 * | 7/2008 | Cheriton | ...................... | 711/108 |
| 2010/0100673 A1 * | 4/2010 | Cheriton | ...................... | 711/108 |
| 2012/0278177 A1 * | 11/2012 | Bender et al. | ............. | 705/14.66 |

OTHER PUBLICATIONS

Fredkin et al. "Trie Memory" Communications of the ACM 1960 vol. 3(9):490-499.
Morrison, D.R. "PATRICIA—Practical Algorithm to Retrieve Information Coded in Alphanumeric" Journal of the Association for Computing Machinery 1968 vol. 15(4):514-534.
Gospodnetić, O. and Hatcher, E. "Lucene in Action" Greenwhich, CT: Manning Publications, 2005. Print.

* cited by examiner

*Primary Examiner* — Jean M Corrielus
(74) *Attorney, Agent, or Firm* — Licata & Tyrrell P.C.

(57) ABSTRACT

The invention refers to a method creating a data structure including many data elements comprising the steps of receiving multiple data elements to be stored from an input data structure, providing a continuous array in memory, allocating memory space within the continuous array for the data elements and storing the data elements in the allocated memory space.
In particular, the invention refers to a method for creating a tree based dictionary from data elements received from an input structure. Moreover, it refers to a method for searching data structures including tokens by means of a tree based dictionary and a method for annotating tokens in a data structure. The invention does also refer to corresponding computer systems, software and storage media.

25 Claims, 7 Drawing Sheets

| length (byte) | 1/8 | 2-1/8 | 2 | c * 1 | b * 1 | b * 8 |
|---|---|---|---|---|---|---|
| function | term | block length | byte count | common bytes | branching bytes | child pointer or entry id |

| length (byte) | 1/8 | 2-1/8 | 8 | 2 | c * 1 | b * 1 | b * 8 |
|---|---|---|---|---|---|---|---|
| function | term | block length | entry id | byte count | common bytes | branching bytes | child pointer or entry id |

| length (byte) | 1/8 | 2-1/8 | 8 | c * 1 |
|---|---|---|---|---|
| function | term | block length | entry id | common bytes |

*FIG. 3*

METHODS, COMPUTER SYSTEMS, SOFTWARE AND STORAGE MEDIA FOR HANDLING MANY DATA ELEMENTS FOR SEARCH AND ANNOTATION

This application claims benefit of priority to EPO application number 09010882.0, filed Aug. 25, 2009, the content of which is incorporated herein by reference in its entirety.

The present invention relates to a method for creating a data structure including many data elements, in particular to a method for creating tree based dictionaries from the data elements. Further, it relates to a method for searching a data structure including tokens by means of a dictionary created according to the invention. Moreover, the invention relates to a method for annotating tokens in a data structure by means of a dictionary according to the invention and by means of the searching method according to the invention. Then, the invention relates to a method for searching an annotated data structure. Furthermore, the invention relates to respective computer systems, software, storage media and computer program products in general for executing and/or storing the methods according to the invention.

Recognising tokens, i.e. data elements with a potential meaning within a data structure, e.g. a text document, is an area of intense research and of great interest for commercial applications e.g. in computer based search engines, text processing, determining applications and automated knowledge extraction.

Many of such applications use so-called named entity recognition to annotate the text that is then made available to a search engine or natural language processing to extract associations between those named entities.

Corresponding activities require in general a method for creating a dictionary, a method for searching a data structure using the dictionary and a method for annotating tokens in a data structure.

The number of known technical terms is already overwhelming and still increasing. This is especially true for the names of molecules as identified in chemistry. As the number of known molecules and substances already now exceeds 50 million, such dictionaries become very large, as they need to contain more than several hundred million words and maybe even complex multiword entities.

Known methods for building dictionaries use hash tables. They allow for a fast look up of terms almost independent of the number of entries if the table is large enough. However, a drawback of hash tables is that they are restricted to searching whole words or whole multi-word phrases only. A hash table cannot be used to find for example prefixes or suffixes of a named entity.

An alternative method could include a list of all terms and an index as it is used in data bases, e.g. a B-Tree index. The problem here is the resulting size of the dictionary data, which for a very large dictionary would not fit in the main memory of the computer, resulting in frequent accesses to secondary storage which considerably decreases lookup rates.

The methods known so far are not able to simultaneously contain a very large number of entries and to retrieve named entities, in particular multi-word phrases, with a speed that is necessary when large volumes of text have to be annotated in a short time.

Thus, it is an object of the invention to provide a teaching for memory efficient storage of a dictionary, a dictionary with a compact structure and fast look-up of dictionary entries while providing support for prefix search and suffix search, in particular for handling complex tokens.

It is highly desirable, to provide a teaching which can cope with very large amounts of data, e.g. multi-millions of entries while providing a look-up speed which is comparable to the performance of hash tables, e.g. more than one hundred thousand tokens per second.

The invention is defined in the appended claims.

First, it is referred to a method for creating a data structure including many data elements, comprising the steps of:
  receiving multiple data elements to be stored from an input data structure,
  providing a continuous array in memory,
  allocating memory space within the continuous array for the data elements and
  storing the data elements in the allocated memory space.

This method provides a basis for fast and flexible handling of large amounts of data elements.

"Input data structure" is a generic term and refers to any structure that can comprise the data elements to be processed. The input data structure might e.g. be a list or a database. In particular the input data structure can be a text comprising words and phrases.

The expression "data element" is a generic term for a specific sample of data. In general, this data may be of arbitrary nature. Usually, in the context of this invention, such a data element can be in principle be associated with a meaning. It could e.g. be a word, a multi-word phrase, a symbol, a string, even a binary string, or a comparable entity to which a meaning might be assigned.

In the context of the invention it is referred to such data elements of input structures as "tokens".

The data structures being created by the method according to the invention correspond to a suitable basis for tree based dictionaries (see below). In the context of dictionaries, the stored data elements are called "entries". The storage of a data element of the input structure, i.e. a token, results in an entry. The data element might undergo a transformation while being stored. E.g. storage of a single token does not necessarily result in a single entry but may result in multiple entries (see below).

In an intuitive case, the input data structure is a text file. It contains many words and multi-word phrases corresponding to technical terms as tokens. A data structure is created for hosting the dictionary. The tokens are stored in the dictionary as entries.

As mentioned above, the data elements might be associated with a meaning and/or refer to a concept. If the meaning associated to a data element is to be emphasized and to keep the language simple, it is referred to "terms", "expressions" and "(named) entities"—these expression can relate to the data elements of the input structure, i.e. tokens, as well as to the data elements to be stored, i.e. entries.

In particular, a token can comprise a proper name, or trivial name, plus a rule-based extension (see below). Furthermore, it is dealt with synonyms and/or homonyms (see below).

The data elements are stored in a continuous array. To guarantee a sufficient performance, it is not relied on any memory administration performed by the operating system. An operating system independent memory administration is implemented.

Thus, in particular the steps:
  providing a continuous array in memory,
  allocating memory space within the continuous array for the data elements and
  storing the data elements in the allocated memory space are performed with customized processes and structures being independent from the standard means for memory administration of the operating system.

It is preferred to use a list as input data structure. Corresponding methods are easy to code and tend to be fast in execution. However, other input structures such as data bases or XML-files shall not be excluded.

Such an input list may contain any kind of token as described above.

Since large amounts of data shall be handled, it is preferred to distribute the continuous array over primary and secondary memory. The array might be simultaneously distributed over at least two different types of secondary memory.

Typically, the secondary memory might be a cache, a hard drive, a compact disc or a flash memory.

According to a preferred embodiment of the invention, the continuous array is a single enlargeable, continuous byte array, having the same compact data structure in the primary memory and secondary memory.

Reasons not to store data elements individually in memory are e.g.:

Parts of the data structure, in particular a dictionary, can simply be paged from and to secondary memory units allowing the array to be larger than the main memory, i.e. the random access memory. Furthermore, pointers referring to data elements, e.g. entries in respective tree nodes (see below), stored in the data structure are independent from their location in memory, so the data can simply be persisted by writing the array to a stream and reading the array as a stream. Moreover, the data format on secondary memory units might be chosen to be identical to the data format for computation, enabling the method to work on the written data directly.

During creation of a dictionary according to the invention, a huge number of memory ranges need to be allocated and/or released. This represents a problem at least for programming environments with automatic garbage collection like JAVA where performance can decrease considerably. Maintaining an own list of free memory ranges, e.g. storage space for nodes, facilitates fast processing.

Thus, it is preferred to change a stored data element by involving the steps:

releasing the memory space containing the stored data element and allocating new memory space, wherein a list of free memory space is maintained independent of corresponding means of the operating system.

Within an array, in particular a byte array, according to the invention, each data element might be stored in a continuous memory block. If the data element changes, the respective block is released and a new, previously free data block is allocated. This new data block can be obtained either from a list of free or freed blocks respectively, or can be allocated after the end of the current data space.

Tests of implementations of the described method have shown that the number of free blocks usually remains small compared to the allocated blocks since there is only a limited number of different block sizes used by the stored data elements, e.g. the nodes of the tree based dictionaries (see below)—resulting in a high probability for finding free blocks of the required size.

Since creating a data structure having the potential to be a basis for a dictionary according to the invention can be a highly dynamic process, it is preferred to construct the array for storing the data elements as an enlargeable array.

In particular, the invention refers to a method for creating a tree based dictionary from data elements received from the input data structure, comprising the steps of:

associating an identifier with at least a subset of these elements and storing such elements with their respective identifier in a tree within the continuous array, wherein common prefixes or common suffixes of these elements correspond to entries of the tree.

A corresponding tree structure allows for a highly compact representation of the data since each prefix or suffix has to be stored only once. Each entry can be stored in a respective node of the tree.

The respective tokens are stored as entries with unique identifiers, e.g. identification numbers (ID-numbers in short), in a way which allows for a very small memory footprint. A corresponding tree can be searched efficiently, e.g. for annotating text (see below) for further processing with a suitable search engine.

The method allows for creating compact tree based dictionaries from e.g. lists of single and multiword names and phrases. Since either common prefixes or common suffixes are stored, such a dictionary allows for prefix or suffix searches. The key for an efficient annotation (see below) is, that an identifier can be associated with any entry.

It is preferred to choose identical identifiers for tokens/entries having the same meaning, e.g. synonyms of named entities such as proper names, concepts or expressions—corresponding methods are introduced in more detail below.

According to a preferred embodiment of the invention, a unicode alphabet representation is chosen. Thus, a large branching count can be obtained. Further, a dictionary implementing UTF-8 byte coding of the strings uses all 256 values of a byte for an alphabet. For ASCII characters, the bytes are equal to characters, characters that are represented as multiple bytes might be distributed over several nodes. The special coding of UTF-8 ensures a correct alphabetical ordering of entries even if characters are spread across nodes.

Based on the method for creating data structures according to this invention, it is preferred to alter the data of nodes by executing at least the following steps:

releasing the memory space containing the node data or entry data respectively and allocating new memory space.

Furthermore, it is preferred not only to store data elements referring to a token within a node, but also a pointer to a child node.

The pointer might be the address of a child node or another identification means.

For a leaf node, the memory range, where usually the pointer is stored, might be used to store the entry identification number as a negative value to distinguish it from pointer.

For facilitating fast changes of the structure of the dictionary, the pointers to child nodes can be indirect. This might be implemented by using an address translation table.

Named entities, i.e. tokens, may have different meanings in different contexts. For example, the word "rapid" is not only a common English word, but also a brand name for an insecticide. The meaning of such ambiguous tokens and hence their annotation can be achieved by analyzing tokens before or after the token to be analyzed, for example by natural language processing. Such analysis may identify the meaning of the entity only with a certain likelihood. Thus, as an input to such further processing and analysis, it might be required to assign multiple identifiers to a token. Using further analysis, each identifier might be associated with a confidence value as well.

As mentioned above, it is preferred to associate synonyms with the same identifier. Like this, annotation by meaning is facilitated.

Further progress can be achieved by associating homonyms with different identifiers.

Homonyms may obtain specific identification numbers within the tree, allowing to distinguish them from entries that do not have homonyms.

It is preferred to associate a confidence value with at least a subset of the entries of the dictionary. The confidence values can be associated with the identifier or a multiplicity of identifiers related to one such entry and might express the confidence in the plausibility of each identifier.

Besides determining if a token corresponds to a named entity, more information about the token might be required, e.g. smiles formula, molecular weight etc. Such per token information can be quite large and complex. Thus, holding it within the dictionary would enlarge it considerably resulting in a slower lookup of tokens. Therefore, it is preferred to place the additional information in a data base and provide entries with references to respective data base records, e.g. by means of one or more identifiers which point to such respective data base records.

E.g., in case of an ontology-aware annotation, each identifier is also part of an ontology or taxonomy, where a parent-children relationship is contained in a separate data-base, e.g. a look-up table, that is constructed in parallel to the dictionary. The tokens can be annotated not only with an identifier for identifying the respective named entity but also with a related parent identifier, e.g. a parent identification number.

In other words, it is preferred to provide at least a subset of the data elements with a reference to a supplementary data structure.

For providing a compact dictionary, it is preferred to employ trees of the so-called PATRICIA architecture.

Corresponding trees have a so-called "trie" architecture—this architecture is introduced below.

Existing methods for dictionary based searching have the following drawbacks: they mainly focus on searching single word names and do not provide a solution for searching multi-word names or phrases and they are not able to search for prefixes or suffixes of dictionary entries.

As mentioned above, the invention also relates to a method for searching a data structure by means of a dictionary created according to the invention. The searching method comprises at least the step: comparing at least one of the tokens with the prefix and/or the suffix of an entry of the tree.

Here, the expressions prefix and suffix of an entry may refer to full entries as well.

In general, prefix and suffix searches are performed by matching dictionary entries to parts of data elements, i.e. tokens, found in the data structure to be searched.

Suffix searches might be performed by means of a reverse tree dictionary. Such a reverse tree dictionary can then be used for a prefix search. A reversed tree dictionary is characterized by the entries being stored in reverse order within the tree.

Two kinds of prefix or suffix search can be performed with the method according to the invention:

(1) Determining if a token in a data structure to be searched is a prefix or a suffix of a dictionary entry. This enables the invention to find out whether a phrase is composed of several tokens, e.g. words. Since the number of tokens which make up such a combined token or named entity is not known, it is best to start with a single token and if it is a prefix/suffix of a dictionary entry add as long following tokens from the input data structure until the full dictionary entry is matched.

(2) Determining if a dictionary entry is a prefix or suffix of a token or a combination of tokens within the data structure to be searched. Thus, a named entity can be identified where a proper name is prefixed or suffixed with a rule based extension, e.g. from a specific knowledge domain such as chemistry, and the complete combination of tokens is not part of the dictionary. Since such a combination of tokens might not be found by rule based techniques alone nor by simple dictionary lookup of the full term and because the number of such possible extensions is extremely high, finding the proper name as prefix or suffix and running a subsequent rule based test for the extension is a viable solution.

Thus, the invention may cope with named entities which do not only comprise single words but may be composed of phrases or multiword entities. Particularly, in scientific texts one may find a very high number of such named entities, such as for example the scientific or trivial names of animal, yeast or plant species. Another example is the naming of chemical compounds that are either described by trivial names and/or rather complex, rule based names. Often, the trivial name comprises a rule based extension. As the number of known molecules and substances already now exceeds 50 million, such dictionaries would become very large, as they need to contain more than several hundred million single words and complex multiword entities.

In general, trained humans are well able to identify novel entities if they are created by rules. Such names may in particular include a combination of a trivial name and a rule based extension. For example, the entity "4-chloro-aspirin" can easily be resolved by a human trained in chemistry, as it is a combination of the trivial, in other words proper, name of aspirin with a rule based extension—the extension denotes to substitute a hydrogen atom at the aromatic ring at position 4. Such rules are typically only valid in a certain domain of knowledge, e.g. chemistry.

The invention is designed to efficiently store and retrieve this kind of information. E.g. by first checking for a complete match and, in case a residual is left, by trying to match the residual with a rule based algorithm.

Furthermore, knowledge domain specific dictionaries can be used to facilitate the integration of rule based algorithms for identifying named entities that contain mixed expressions made up from regular expressions, i.e. trivial names, as found as entries in the dictionary together with rule based prefixes and suffixes, resulting in expressions that are not part of the dictionary.

Another aspect of rule based searching is approximate searching, one might also call it fuzzy searching. This might be relevant if, for example, names and text are comprising errors due to typing errors or faulty optical character recognition (OCR).

In particular, it is preferred to match a token or a combination of tokens with an approximate prefix or an approximate suffix of an entry of a dictionary tree.

One may optionally allow for one or more wild card characters (letters, special characters or spaces). All entries in the dictionary may be considered as hits that match the search token with any type of character replacing the wild cards.

If the tokens of the data structure to be searched do not correspond to entries of the dictionary and if such a token is identified by rule based processing, the corresponding token can be stored within one or more further nodes of the tree.

According to another aspect of the invention, tokens in a data structure are annotated by means of a dictionary according to the invention and by means of the searching method according to the invention, comprising the steps:

matching at least one of the tokens with an entry of the dictionary associated with an identifier and annotating the token of the data structure with the identifier.

In other words, the tokens from the data structure to be annotated are analysed, those tokens may be found to be identical to entries of the dictionary or correspond to a prefix or a suffix of a more complex entry in the dictionary.

The tokens in the data structure to be annotated are then annotated with at least one respective identifier. In case of multiple hits, the respective token or tokens may be assigned multiple identifiers.

It is preferred, to annotate the tokens with a confidence value as well.

One may, for example, add a lower confidence value to certain identifiers. A corresponding rule might be based on the number of wild cards, e.g. the more wild cards are needed to find a hit, the lower the confidence value is. As an alternative, the inverse ratio of wild card characters versus the number of non-wild card characters might be chosen as a confidence value.

In case that a token is found in multiple dictionaries or in a list of common words of a given language, optionally a lower confidence value may be assigned along with the identifier. Alternatively, the environment of the token is submitted to a further analysis engine that determines the likelihood of the token belonging to a certain knowledge domain. A corresponding confidence value can be determined on this basis as well.

If the tokens in the data structure to be annotated belong to a semantic system, e.g. a hierarchical semantic system, the method may comprise the step: annotating a token with a reference associated with information related to the relationship of this token to at least one other token of the corresponding semantic system.

E.g. in case of an ontology-aware annotation, each identifier may also be part of an ontology or taxonomy, where the parent/children relationship is contained in a separate data base, e.g. a lookup table, that is constructed in parallel to the dictionary. The annotation of the tokens does then not only contain the found named entity identifiers but also the related parent identifiers.

According to another aspect of the invention, a further method for searching a data structure is provided, comprising the steps:
 annotating tokens in a data structure by means of the annotation method according to the invention,
 converting a query-term to an identifier and
 searching the identifier within the annotated data structure.

To sum up, embodiments of the invention are listed below in a concise way:
1. Method for creating a data structure including many data elements, comprising the steps of:
receiving multiple data elements to be stored from an input data structure,
providing a continuous array in memory,
allocating memory space within said continuous array for said data elements and
storing said data elements in said allocated memory space.
2. Method according to embodiment 1, in which said input data structure is a list.
3. Method according to embodiment 1 or 2, in which said continuous array is distributed over primary and secondary memory.
4. Method according to embodiment 3, in which said array is distributed over at least two types of secondary memory.
5. Method according to one of embodiments 1 to 4, in which altering a stored data element is performed involving the steps:
releasing said memory space containing said stored data element and
allocating new memory space, wherein an operating system independent list of free memory is maintained.
6. Method according to one of embodiments 1 to 5, in which said array is enlargeable.
7. Method according to one of embodiments 1 to 6 for creating a tree-based dictionary from said data elements received from said input data structure, comprising the steps of:
associating an identifier with at least a subset of these data elements,
storing data elements with their respective identifier in a tree within said continuous array, wherein one of common prefixes and common suffixes of said elements correspond to entries of said tree.
8. Method according to embodiment 7, in which altering one of said entries is performed involving the steps:
releasing the memory space containing said entry and allocating new memory space.
9. Method according to embodiment 7 or 8, in which an entry corresponds to a node and includes a pointer to a child node.
10. Method according to embodiment 9, in which pointers to child nodes are indirect.
11. Method according to one of embodiments 7 to 10, in which synonyms are associated with an identical identifier.
12. Method according to one of embodiments 7 to 11, in which homonyms are associated with different identifiers.
13. Method according to one of embodiments 7 to 12, in which a confidence value is associated with at least one of said entries.
14. Method according to one of embodiments 7 to 13, in which at least a subset of said entries is referenced to a supplementary data structure.
15. Method according to one of embodiments 7 to 14, in which said tree is a PATRICIA-tree.
16. Method for searching a data structure including tokens by means of a dictionary created according to one of embodiments 7 to 15, comprising the step:
comparing at least one of said tokens with one of a prefix and a suffix of an entry of said tree.
17. Method according to embodiment 16, comprising the step:
determining if one of said tokens is one of a prefix and a suffix of an entry of said tree.
18. Method according to embodiment 16, comprising the step:
determining if an entry of said tree is one of a prefix and a suffix of a token.
19. Method according to embodiment 18, comprising the steps:
checking for one of a complete match and a residual and attempting to match a residual with a rule-based algorithm.
20. Method according to embodiment 19, in which a residual which is matched by means of said rule-based algorithm is stored within a further entry of said tree.
21. Method for annotating tokens in a data structure by means of a dictionary created according to one of embodiments 7 to 15 and
by means of the searching method according to one of embodiments 16 to 20, comprising the steps:
matching at least one of said tokens with an entry of said dictionary comprising an identifier and
annotating said token of said data structure with said identifier.
22. Method according to embodiment 21, in which said token is annotated with a confidence value as well.
23. Method according to embodiment 21 or 22, in which said token belongs to a hierarchical semantic system, comprising the step:

annotating said token with a reference referring to information related to the relationship of said token to at least one other token of said semantic system.

24. Method according to one of embodiments 21 to 23, in which multiple identifiers are assigned in case of multiple matches.

25. Method for searching a data structure including tokens, comprising the steps:

annotating tokens in said data structure by means of the annotation method according to one of embodiments 21 to 24, converting a query term to an identifier comprised in said dictionary and searching said identifier within said data structure.

26. Computer system adapted for creating and handling data structures and creating dictionaries according one of embodiments 1 to 15.

27. Computer system adapted for searching by means of a dictionary according to one of embodiments 16 to 20.

28. Computer system adapted for annotating tokens in a data structure according to one of embodiments 21 to 24.

29. Computer system adapted for searching an annotated data structure according to embodiment 25.

30. Software for executing a method for creating and handling data structures and creating dictionaries according one of embodiments 1 to 15.

31. Software for executing a method for searching by means of a dictionary according to one of embodiments 16 to 20.

32. Software for executing a method for annotating tokens in a data structure according to one of embodiments 21 to 24.

33. Software for executing a method for searching an annotated data structure according to embodiment 25.

34. Storage medium storing software according to one of the embodiments 30 to 33.

35. In other words, embodiment 7 comprises the steps of embodiment 1, embodiment 16 may comprise steps of embodiment 1 and embodiment 7, embodiment 21 may comprise the steps of embodiment 7 and embodiment 16 and embodiment 25 may comprise the steps of embodiment 21. In other words, embodiment 16 can be interpreted as a use of embodiment 7; embodiment 21 can be interpreted as a use of embodiment 7 and of embodiment 16, while embodiment 25 can be interpreted as a use of embodiment 21.

Hereunder, preferred embodiments of the invention will be described in more detail. These embodiments are merely illustrative and are not meant to limit the scope of the invention as defined in the claims. The features disclosed would also be relevant in other combinations.

FIG. 3 shows node structures.

TRIE ARCHITECTURE

Since the invention allows for very compact trie based dictionaries, it is referred to corresponding dictionaries as "compact trie based dictionary (CTD)". CTDs according to the invention allow for named entity recognition while holding multiple million entries, providing fast lookup of terms and providing support for prefix and suffix lookup (e.g. more than 100,000 terms per second).

The invention builds on and extends the known trie structure. A trie is an ordered tree data structure as described in Edwards Fredkin (1960); "Trie Memory"; Communications of the ACM 3 (9):490-499.

A trie allows to store a list of terms with common prefixes economically. Edges are labelled with characters from the alphabet of the strings to be stored. Nodes represent strings which are a concatenation of the edge labels on the path starting at the root node. The root node itself represents the empty string. Most inner nodes do not represent complete strings added to the trie. Thus inner nodes having a string ending in them are explicitly marked. An example trie is shown in FIG. 1.

Figure 1:
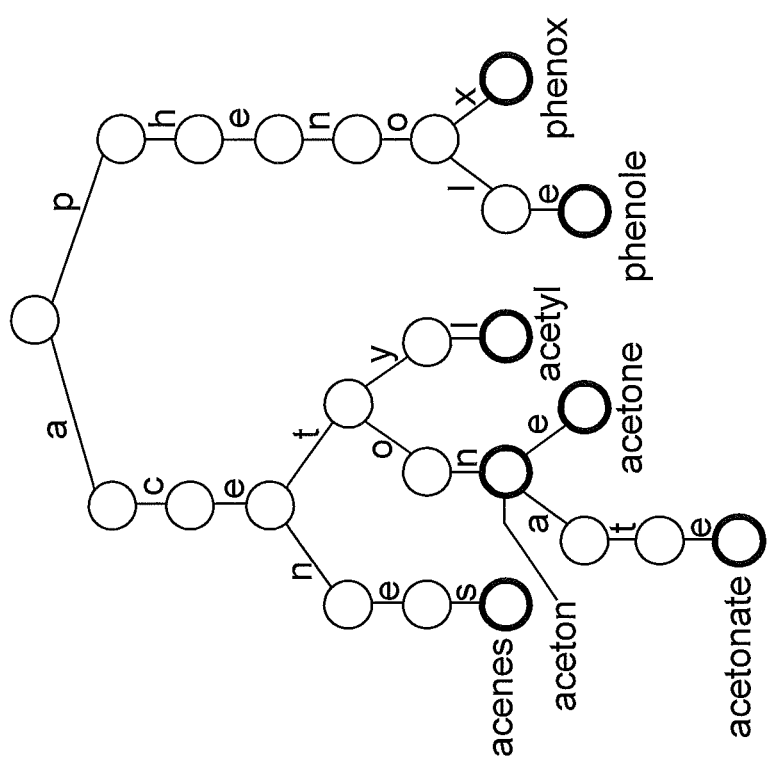
FIG. 1 shows a sample trie with seven entries.

FIG. 1 shows a trie containing the entries acenes, aceton, acetonate, acetone, acetyl, phenole and phenox. Note that aceton is a prefix of the entries acetonate and acetone and therefore ends in an inner node which is marked for an ending entry.

The tree structure can be very compact, since common prefixes of entries are stored only once.

The time to search a trie based dictionary for an entry depends almost only on the search term length since one walks the tree starting at the root node along the edges corresponding to characters of the term to be looked up. The number of entries in the trie has only a minimal influence on the search time. More entries will only lead to a larger branching count of the inner nodes, resulting in an increased number of comparisons needed to choose the next edge to follow. Since the average branching count depends logarithmically on the number of entries this number has only a small impact on search time.

As emphasized before, a valuable property of the trie is the possibility to search for prefixes. Both kinds of prefix search are supported (see above). If a term is looked up, one walks along the labelled edges. If the token ends before a marked inner node or a leaf node is found, the term is a prefix of at least one dictionary entry. If a marked inner node or a leaf node is found before all characters of the token are processed, the corresponding dictionary entry is a prefix of the token, i.e. the search term.

Depending on the entries in a trie, it may contain many inner nodes with only a single child note (as shown in FIG. 1). In order to get a more compact trie with reduced storage size a PATRICIA tree was proposed by Donald R. Morrison ("PATRICIA-Practical Algorithm to Retrieve Information Coded in Alphanumeric", Journal of the ACM, 15 (4): 514-534, October 1968). Here, a node with a single child is merged with its child to a single node concatenating the edge labels.

Figure 2:
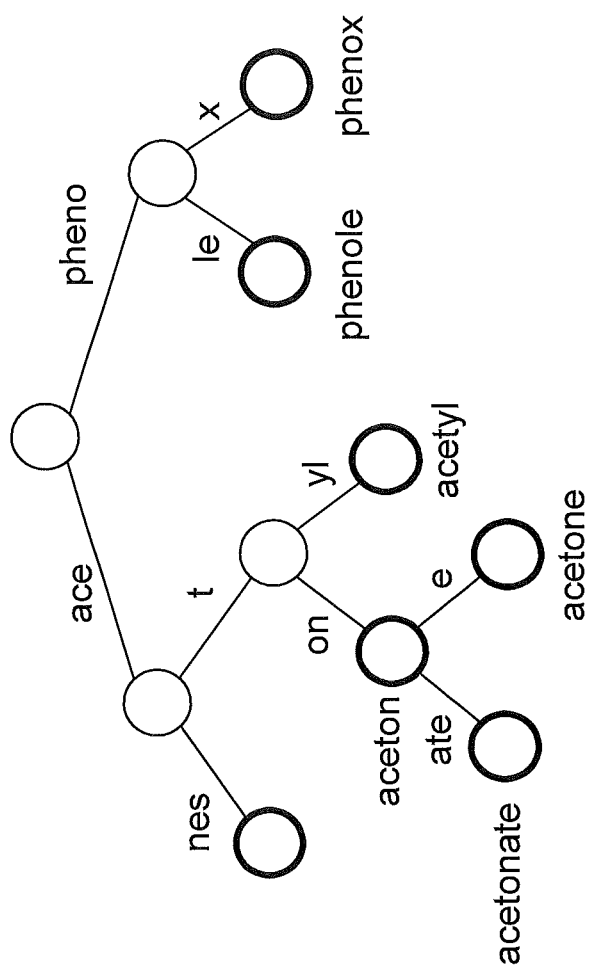
FIG. 2 shows a sample PATRICIA trie.

A PATRICIA tree version of the sample trie of FIG. 1 is shown in FIG. 2. In the original work, the outgoing edges are labelled only with a differing character and the number of characters, which can be skipped until the next character must be compared to decide which edge to follow.

This can further reduce tree size, especially with binary strings. However, after a match, the search term must be compared with a string pointed to by the final inner node or leaf node in order to ensure the skipped characters match the dictionary entry.

Preferred embodiments of the invention build on the foundations of the PATRICIA tree with completely labelled edges as shown in FIG. 2.

As can be concluded from the just described architecture and from the description of the methods according to the invention, PATRICIA tries are a viable basis to (1) provide a highly compact data structure for efficient storage, (2) allow efficient operation on main memory, integrating also secondary memory units and (3) allow for fast updates of a dictionary without the need for rebuilding or indexing the whole dictionary.

Node Structure

The tries according to the invention can be build based on different alphabets. Choosing a binary representation of entries would result in inner nodes with only two branches. This would allow for small node representations, however, the number of nodes to look up and compare for each search term, i.e. token, would be rather high.

Using unicode yields a large branching count. Moreover, storing a character would consume 2 bytes. Therefore, a UTF-8 byte coding is employed which uses all 256 values of a byte as alphabet.

The CTD data tree is stored by means of nodes having pointers to child nodes. These pointers represent the edges of the tree. If a pointer would point to a leaf node which has no further character to add to the entry, the pointer itself can be used as an entry identifier instead of being a pointer. To distinguish a pointer from an identification number, the identification number is stored as a negative value internally. As a result, there is no need for additional space for identification numbers.

Each node has a field with common characters which are the labels of the PATRICIA tree edges which are not used for branching. In case an entry terminates after the common characters, an identification number field is added. As a marker for telling if an entry ends after the common characters, the highest bit of the first byte is set (i.e. the length field contains a negative value).

The node data structure of the CTD is one of the following three structures and is depicted in FIG. 3:

(1) A full node where an entry ends after common bytes and at least one branching entry or common byte count is larger as size (child pointer)+size (byte count)—top section of FIG. 3. term: the most significant bit of first byte indicating if an entry ends in this node after common bytes (set to 1); block length: length of the payload in the block (everything after this field); entry ID: identification number of the entry ending after common bytes; byte count: number of bytes in common bytes and branching bytes; the number of branching bytes can be calculated by dividing the remaining block size by the size of a child pointer (for each branching byte exists a child pointer); child pointer: either a pointer to the child node or an entry identification number if the entry ends after a branching byte.

(2) A node where no entry ends after common bytes (term is 0; entries may end after a branching byte where an entry identification number is found instead of a child pointer)—middle section of FIG. 3.

(3) A leaf node with a maximum of size(child pointer)+size (byte count); it is distinguished from the other nodes by its block length which is too small to fit a branch and the byte count field—bottom section of FIG. 3.

Figure 4:
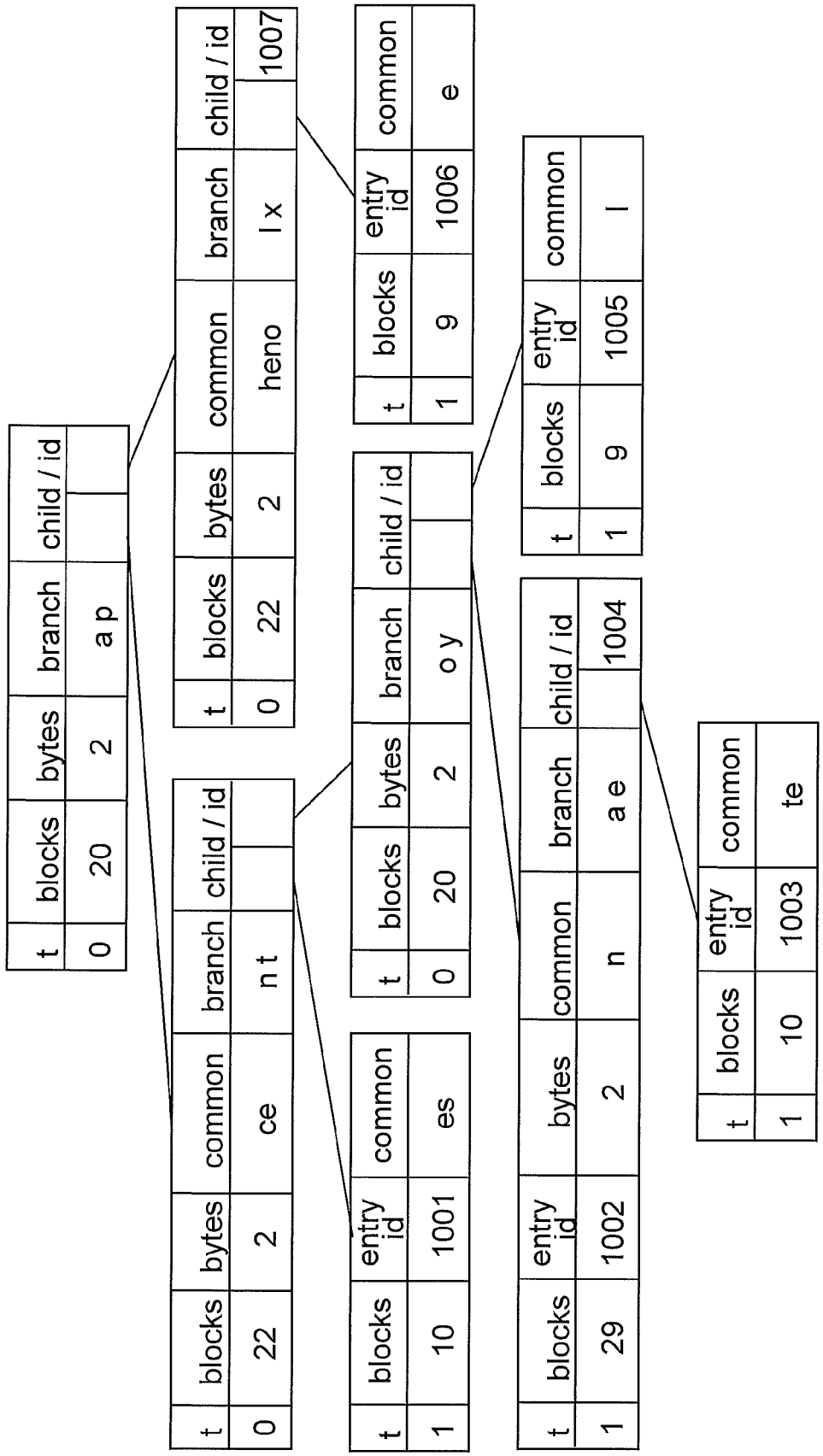
FIG. 4 shows node data in a trie dictionary.

The node data CTD structure of the sample shown in FIG. 2 is depicted in FIG. 4.

The data structure shown in FIG. 4 represents a highly compact variant, which is used if the data is rather static—e.g. no further data will be added or deleted for a while.

If the dictionary has to be changed a lot, for example during a large build up process, the pointers to child nodes can be chosen to be indirect, using an address translation table. Such a translation table enables a movement of nodes without the need for simultaneously also updating the respective parent node—which is not known by the child. The new node address will only be updated in the translation table.

Figure 5:
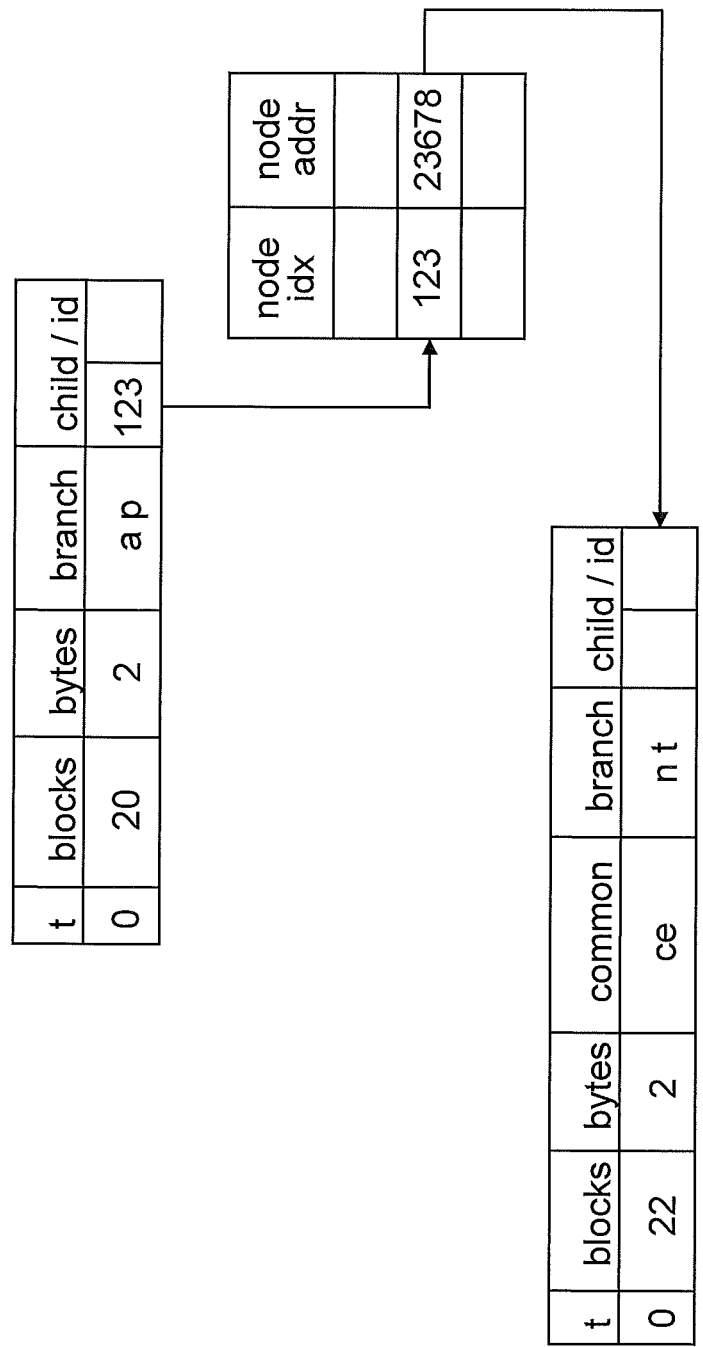
FIG. 5 shows nodes of a trie dictionary with an address translation table.

Using the node index to address a translation table is shown in FIG. 5.

If the number of entries to be stored is less than $2^{31}$ and the identification numbers associated with the entries are below $2^{31}$ as well, 4 bytes can be used for addressing instead of 8 bytes which reduces data size by approximately 40%.

Storing and Managing Nodes

The nodes of a CTD are stored within an expandable array of bytes. Here, such an array is called EArray. EArrays according to the invention are designed to be enlargeable without the need for copying existing data while on the other hand accessing EArrays is at least not much slower than working with build-in arrays.

An EArray comprises a number of subarrays which are small standard arrays of the same size. Concatenating the subarrays one yields a large array. Concatenation is done using a list with pointers to the subarrays. Having subarrays with sizes of a multiple of two one can really fast compute the list entry pointing to the sub-array which corresponds to a given index using shift operations. Furthermore, it is not necessary to have all subarrays in main memory but one can have them as well for instance on secondary storage—reading them only if there is an access in the range covered by the specific sub-array.

If one has the EArray on secondary storage one can simply do paging of subarrays as required—just like an operating system handles memory pages. So there is no need for a main memory of the size of the array.

There are further advantages related to the EArrays according to the invention:

- EArrays are expandable without copying data whereas enlarging standard arrays normally involves first allocating new larger space, copying existing data to new space and freeing up old space; while EArrays only add a new subarray—existing data remain in their respective subarrays. Only a list with pointers to subarrays must be increased in a common way, but the size of this list is negligible. Therefore, copying data is fast and needed also rather seldom.
- On 32 bit systems EArrays can be larger than 2/4 GB. The maximum size of an EArray depends on the maximum size of the list with pointers to subarrays and the subarray size.
- The array does not have to be completely loaded on program startup but one can load subarray by subarray as needed what results in a fast startup.

Storing nodes in an EArray instead of using objects for each node in main memory has several advantages:

- very fast storage and retrieval to and from secondary storage respectively; node objects would have to be traversed along the tree to save them and the pointers to subnodes pointing to main memory addresses would have to be replaced;
- memory consumption is minimized; objects come with a memory overhead;
- performance is improved while the dictionary is created. This is due to the advantageous handling of the free memory space within Earrays, there is no need for garbage collection.

Each node is stored as a chunk in the EArray. A chunk is simply a continuous number of bytes within an EArray. It starts with a two byte header holding the size of the payload of the chunk. Furthermore, the most significant bit of the header is used as a boolean property which can be used by the nodes. Thus, the payload of a chunk has a maximum size of $2^{15}-1$ (32767).

Such a header was already depicted in the node layout and FIG. 4 before.

If a node needs to be enlarged, a new chunk is allocated and a pointer to the old chunk space is added to a size-sorted list of free chunks.

One first tries to get the new chunk from the list of free chunks (the size has to match exactly) and only if no such chunk is available, new space is allocated at the end of the EArray. Since there is a limited number of node sizes, the list of free chunks is typically small and cheap to manage.

At the very beginning of an EArray, the first bytes (the number depends on the size of a node pointer) contain the address of a root node. If the root node changes position within the EArray, the new address is written to the EArray start.

Creating CTDs

Before annotating documents using a CTD, a dictionary is created. The dictionary is created by filling it with entries and IDs. The entries are available from a list or data base containing the necessary data.

The ID range is split into smaller ranges having a subrange for each term category like chemistry, diseases etc. which alleviates managing term IDs.

For a dictionary with 16.96 million entries, the invention achieves a dictionary storage (or memory) size of 222.8 MB, which is only half the size of a file containing all entries with an identification number as a list (444.8 MB). Such a dictionary can process 500,000 random lookups on an Intel Core Duo T8300 CPU (2×2.4 GHz) and up to 1,000,000 alphabetically sorted lookups per second, which is orders of magnitude faster than using database lookups. The speed increase for sorted lookups results in data locality with a larger hit rate in CPU cache. This can be expected in real world data as well since the distribution of the looked up tokens corresponds to a Zipf distribution.

Handling Synonyms

For a named entity there might exist several synonyms describing the same object, meaning or concept. According to the invention, the IDs are preferably identifiers of the respective object or concept, not of a specific token—however, the invention is not restricted to this approach.

Therefore, synonyms of a specific token will receive the same ID. With this approach, the method allows to search directly with all synonyms of a search term when querying documents. When creating a CTD, all synonyms are added to the dictionary having all the same ID.

Beside lists or databases containing synonyms, there is another source for gathering synonyms. In text documents, named entities are often followed by an abbreviation of the named entity in parenthesis. With a special detection module one may find these abbreviations and add them as synonyms for the named entity.

The concept related IDs according to the invention are also called OCIDs.

Handling Homonyms

Two cases of homonyms are distinguished.

First, there might be homonyms within the domain the CTD is created for. These homonyms will have multiple IDs within the CTD (one for each meaning).

Homonyms can be associated with a special ID which is returned by the CTD and triggers a domain module for handling homonyms. When indexing a text, a special domain module may be used to select the most appropriate ID, e.g. an abbreviation detection step could be carried out before revealing the actual meaning of an abbreviation. In case no single ID can be preferred according to context information, the text phrase will be annotated with all IDs for this CTD entry; corresponding confidence values may be included.

Furthermore, homonyms may occur if they appear in different CTD knowledge domains, as already mentioned above—see the "rapid" example above. When creating a CTD, such homonyms have to be detected, e.g. by comparing term lists from different domains or from common language, and typical environments where the term appears have to be identified. These environments are checked for a homonym found in the text to be annotated. Again, the CTD returns a special ID for homonyms which triggers an environment identification module. If a typical environment is found, the term is annotated accordingly—maybe there is no annotation, if the term is a common term.

If the environment could not be matched, all domains of the homonym can be annotated with a decreasing confidence value. As an example, the domains can be ordered by the probability that a term will be a member of them. The confidence value for each annotation can be chosen to be directly related to the probability of the term to be a member of the respective domain.

Storing Multiple IDs Per Entry within a CTD

Usually, only one identifier is stored with each entry. In some cases, however, e.g. homonyms, it is necessary to assign multiple identifiers to a single entry.

Multiple IDs can be introduced while retaining the advantageous memory space structure introduced so far.

In case of multiple IDs, the IDs are stored by means of a special ID-node. At the position where the trie node usually contains the single ID of an entry, now the address of the special ID-node is stored.

It is differed between the address of a trie node and the address of an ID-node by the following arrangement: The address range available by the pointer size is divided by half. The lower half represents addresses to trie nodes, the upper half represents addresses to ID-nodes.

Looking at the address bit layout, this means that if the most significant bit below the sign bit is set, the address points to an ID-node. Thus, with 32 bit address pointers one can address $2^{30}$ nodes (about one billion) which may be too restrictive. But with 64 bit one has an address space of $2^{62}$ which is by far enough.

Figures 6, 7:
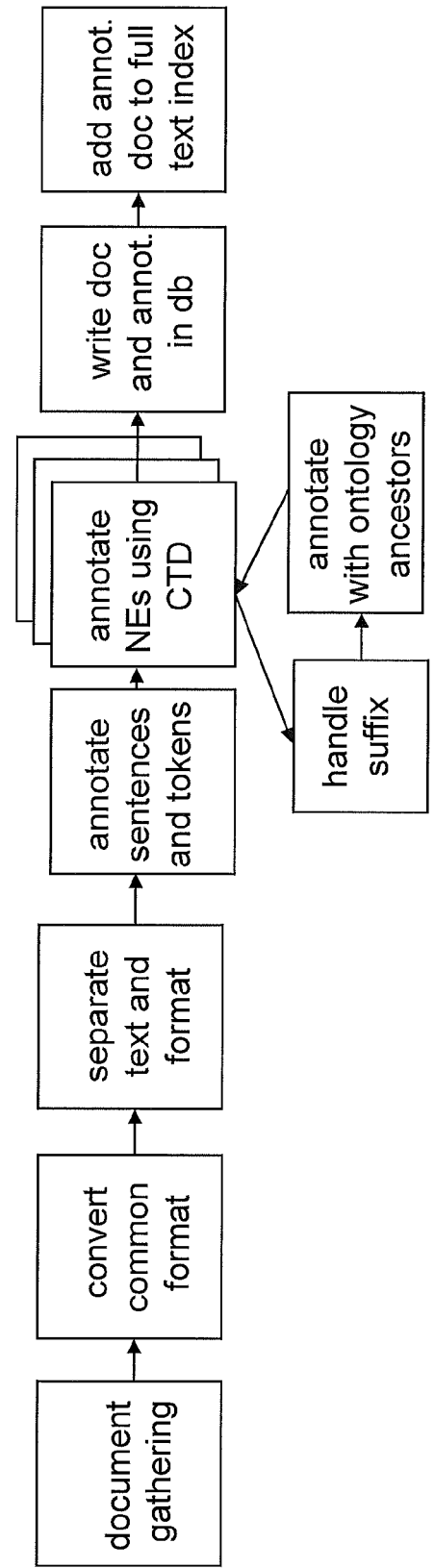
FIG. 6 shows ranges of a pointer in trie node.
FIG. 7 shows a diagrammatic representation of document processing.

A next node ID pointer in a trie node has now ranges as depicted in FIG. 6 (32 bit).

ID nodes use the same chunks in the EArray as trie nodes. Thus, there is a two byte header with payload size and the boolean property. ID nodes can be chained in order to support an arbitrary number of identifiers. Therefore, there are two kinds of ID nodes. Inner nodes (another node is following) and end nodes. Between these types of nodes it is differed by means of the boolean property. If the boolean property is set, there is an end node, otherwise it is an inner node. Inner nodes start with the address of the next ID-node followed by 255 IDs. Thus one can traverse the chain in a fast way by only reading the first bytes of an ID-node. An end node starts with a byte containing the number of IDs within this node followed by the respective number of IDs (1-255).

Named Entity Recognition by Means of a CTD

In general, named entity recognition according to the invention uses a dictionary including the following steps:

(1) preparing the text, e.g. removing formatting rules;
(2) splitting text in sentences and tokens, a token may e.g. be a word, a phrase or a non-letter symbol; and
(3) looking up the tokens in the dictionary and annotate them if they are included.

In the simplest case, the algorithm according to the invention walks through the text token by token and looks up each token in the dictionary. If the token is found within the dictionary, it is annotated with the identifier associated with the respective entry of the dictionary.

Chemical Named Entity Recognition (CNER)

CNER possesses specific challenges.

Named entities often comprise multiple words, e.g. phrases. Then, named entities may be a composition of a proper name (or a trivial name) and a formula based name, i.e. a rule based name. Possible formula based names are very numerous, indeed in some cases, much too numerous to be stored in the dictionary. Furthermore, a named entity, in particular its trivial name, might be a synonym for a common word, e.g. rapid.

Handling Phrases

For dealing with phrases, a dictionary which only allows for checking for a complete match, like a hash table, is disadvantageous, as described above.

When looking up a token by means of a tree dictionary according to the invention, it can be checked whether a token is a prefix of at least one entry of the dictionary. In this case, the next token is added and the combination of both tokens, e.g. a phrase, is looked up. This is repeated until the complete combination of tokens is matched to an entry or the phrase cannot be found.

Heuristics for Look-Up

Since tokens embedded in a data structure to be annotated may be connected by e.g. spaces, a dash or other signs, one can process the whole combination of tokens, e.g. the whole phrase, from the underlying text starting at the start position of the first token and ending at the end position of a last token while normalizing white spaces.

Words within a text are often normalized using stemming or lemmatisation. However, for chemical named entity recognition, this might change the essential parts of the entity. As a consequence, it cannot be found anymore or matches only a more general entry. Since most named entities are nouns, we have only to deal with a small number of inflections. In the majority of cases, a suffix might be added to the entity, e.g. a plural "s" in English. Prefix search can deal with this kind of inflection. It is simply determined if an entry is a prefix of the token or the phrase. If this is the case, it is tested if the remaining part, i.e. the residual of the search term is a common suffix, e.g. "s", in which case the token is annotated with the entry ID of the corresponding entry—provided the complete term is not found in the dictionary.

Annotation Using CTD and Rule Based Recognition

In particular, chemical names can correspond to a combination of a proper (or trivial name) and a rule based part as prefix or suffix.

By means of a tree dictionary according to the invention, the proper name can be detected. Then, the structure of a residual, if any, is looked up and transferred to a rule based module which processes the rule based residual.

In case the rule based part is a suffix of the proper name, the prefix detection is employed. If a dictionary entry is a prefix of the respective term, it is handed over to the suffix processing module.

If the formula part is a prefix of the proper name (the proper name is a suffix of the formula part) one of the following alternatives might be chosen:

If the formula part is connected to the proper name via a token separating character—like space or a dash—the proper name is found by means of a usual search within a tree dictionary. Then, the formula processing module is called which has to test the preceding tokens.

In case the formula part is not separated, one can employ an additional tree dictionary with reversed entries. Instead of creating the trie starting at the root with a first token character, it is started with the last characters so that in a leaf node (or inner node) are the first token character. Now the text is processed token by token starting at the last token and going to the beginning of text.

The further processing corresponds to the first case where the formula is a suffix of the proper name.

Using a tree dictionary according to the invention one can also first detect the proper name, identify the rule base part and submit both parts to a rule-based module which then processes the rule based part.

For such a complex named entity, i.e. the just identified named entity, a new node might be added to the tree dictionary including this new entity as an entry. A new identifier can be added to the new entry as well. As an alternative, the new named entity might be added to a data base.

Heuristics for Annotation

During named entity processing one may add some further heuristic actions to facilitate annotation.

For example, one may add a list of words, which are very common in natural language text (depending on the language), as stop words. Confidence values of named entities which match one of the stop words can be reduced. This can be used to influence the weight the term will have in the full text index and is respected when the results are displayed.

For searching text, upper/lower case is normally disregarded. However, in order to distinguish named entities from common words, case can be helpful. Therefore, a special transformation algorithm is run which keeps upper case characters in special situations intact.

E.g. one might check for each sequence of contiguous letter characters (there might be several of such sequences in the named entity) if only the first character is upper case and if there are at least two characters. If this is true, the first character is retained in upper case.

Furthermore, one can reduce the number of tokens to be annotated. E.g. by setting up a requirement with which any named entity must comply. E.g. no annotation, if the token has less than three characters or is just a number (only digits and a dot).

Ontology Based Document Processing

In order to query large collections of documents for specific terms, such as ontologies or taxonomies of plants and animals or chemical structures, the documents are better pre-processed and indexed. A crucial success factor is the ability to enrich the search, the synonyms and ontological terms to find relevant documents.

For example, a user may want to find all the mentioning of plants in a text document. This user demand requires not only that all plant names with their respective synonyms are part of a dictionary, but also they need to be annotated through their taxonomy to the ontology parent term plant.

A main concept according to the present invention for using the CTD indexing is the association of named entities with identifiers, e.g. unique and stable identification numbers.

During the indexing step using the text documents, all named entities are annotated with their respective identifier returned by a suitable CTD.

When searching text documents, the query terms are converted to their respective identification number and these identification numbers are searched by a suitable full text indexer such as for example Lucene (Otis Gospodnetic, Erik Hatcher: Lucene In Action, Manning Publications, 2004). Only if the search term cannot be converted to an identification number, the term is searched as a standard full text entry.

FIG. 7 shows a possible work flow for providing an annotated document.

Figure 8:
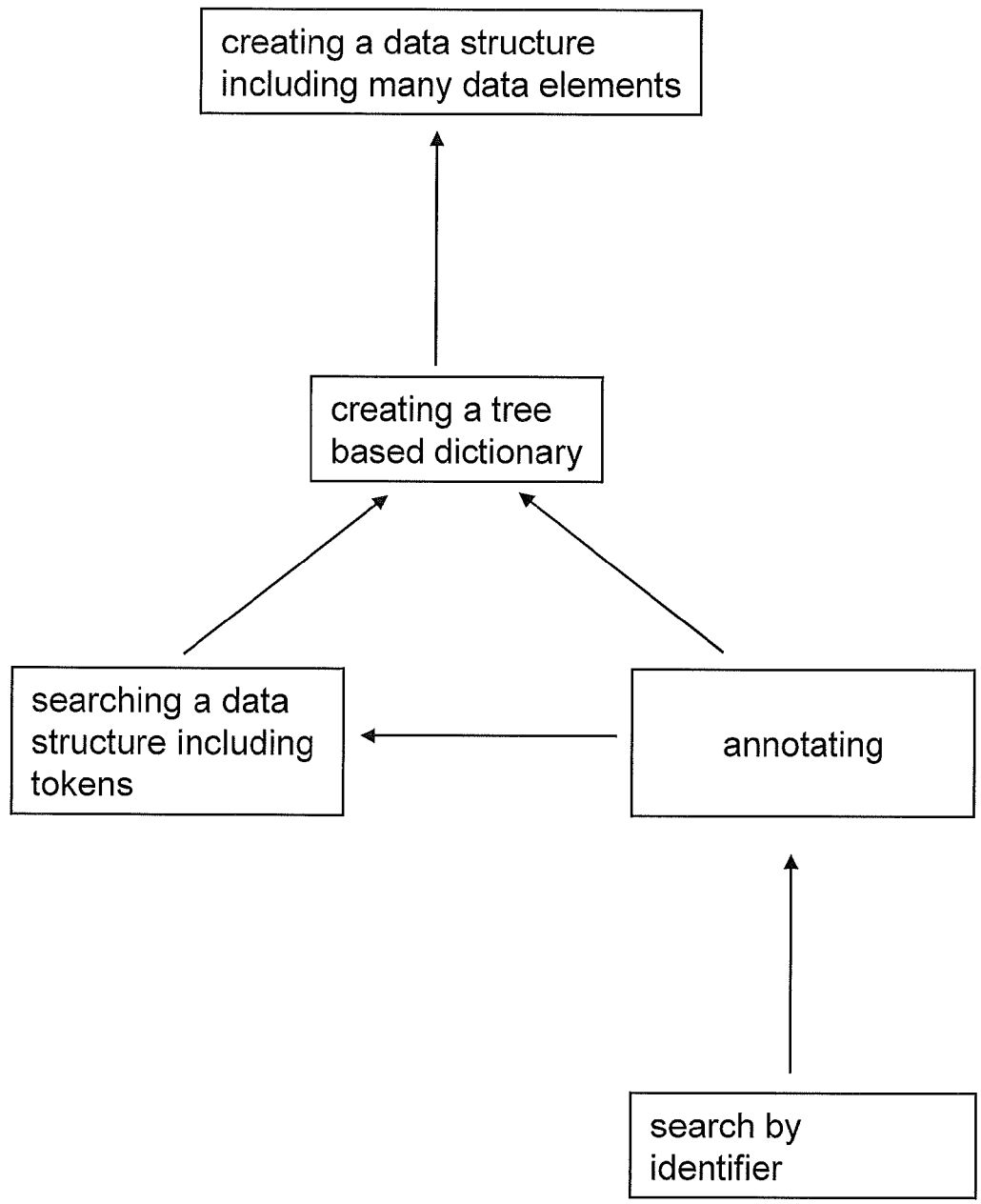
FIG. 8 depicts the relationships of the methods according to the invention.

FIG. 8 depicts the relationships of the methods according to the invention among each other. The method for creating a tree based dictionary is based on, indicated by the arrow, the method for creating a data structure including many data elements. The method for searching a data structure including tokens is based on the method for creating a tree based dictionary. The method for annotating tokens in a data structure is based on both, the method for creating a tree based dictionary and the method for searching a data structure including tokens. Furthermore, the method for searching by means of an identifier is based on the method for annotating tokens in a data structure.

The invention claimed is:

1. Method for creating a data structure including many data elements, comprising the steps of:
   receiving multiple data elements to be stored from an input data structure,
   providing a continuous array in memory,
   allocating memory space within said continuous array for said data elements, wherein said continuous array is distributed over primary and secondary memory
   storing said data elements in said allocated memory space, and
   creating a tree-based dictionary from said data elements received from said input data structure, comprising the steps of:
   associating an identifier with at least a subset of said data elements,
   storing each data element with an identifier in a tree within said continuous array, wherein one of common prefixes and common suffixes of said elements correspond to entries of said tree.

2. Method according to claim 1, in which an entry corresponds to a node and includes a pointer to a child node.

3. Method according to claim 1, in which synonyms are associated with an identical identifier.

4. Method according to claim 1, in which homonyms are associated with different identifiers.

5. Method according to claim 1, in which said tree is a PATRICIA-tree.

6. The method of claim 1, further comprising searching the data structure by means of the dictionary which includes tokens by:
   comparing at least one of said tokens with one of a prefix and a suffix of an entry of said tree.

7. The method of claim 6, further comprising the step:
   determining if one of said tokens is one of a prefix and a suffix of an entry of said tree.

8. The method of claim 6, further comprising the step:
   determining if an entry of said tree is one of a prefix and a suffix of a token.

9. The method of claim 8, further comprising the steps:
   checking for one of a complete match and a residual and attempting to match a residual with a rule-based algorithm.

10. The method of claim 6, further comprising annotating the tokens in the data structure by:
    matching at least one of said tokens with an entry of said dictionary comprising an identifier and
    annotating said token of said data structure with said identifier.

11. The method of claim 10, wherein said token belongs to a hierarchical semantic system, comprising the step:
    annotating said token with a reference referring to information related to the relationship of said token to at least one other token of said semantic system.

12. The method of claim 10, wherein multiple identifiers are assigned in case of multiple matches.

13. The method of claim 10, further comprising searching the data structure including tokens, comprising the steps:
    converting a query term to an identifier comprised in said dictionary and
    searching said identifier within said data structure.

14. A computer program product or computer system for executing the method of claim 1.

15. A method for searching a data structure including tokens comprising
    receiving multiple data elements to be stored from an input data structure,
    providing a continuous array in memory,
    allocating memory space within said continuous array for said data elements, wherein said continuous array is distributed over primary and secondary memory,
    storing said data elements in said allocated memory space,
    creating a tree-based dictionary from said data elements received from said input data structure, comprising the steps of:
    associating an identifier with at least a subset of said data elements,
    storing each data element with an identifier in a tree within said continuous array, wherein one of common prefixes and common suffixes of said elements correspond to entries of said tree and
    searching the data structure by means of the dictionary which includes tokens by comparing at least one of said tokens with one of the prefix and the suffix of the entries of the tree-based dictionary to search the data structure.

16. The method of claim 15, comprising the step of determining if one of said tokens is one of a prefix and a suffix of an entry of said tree-based dictionary.

17. The method of claim 15, comprising the step of determining if an entry of said tree-based dictionary is one of a prefix and a suffix of a token.

18. The method of claim 17, comprising the steps:
    checking for one of a complete match and a residual and attempting to match a residual with a rule-based algorithm.

19. A computer program product or computer system for executing the method of claim 15.

20. A method for annotating tokens in a data structure comprising the steps of:
    receiving multiple data elements to be stored from an input data structure,
    providing a continuous array in memory,
    allocating memory space within said continuous array for said data elements, wherein said continuous array is distributed over primary and secondary memory,
    storing said data elements in said allocated memory space,
    creating a tree-based dictionary from said data elements received from said input data structure, comprising the steps of:
    associating an identifier with at least a subset of said data elements,
    storing each data element with an identifier in a tree within said continuous array, wherein one of common prefixes and common suffixes of said elements correspond to entries of said tree,
    searching the data structure by means of the dictionary which includes tokens by comparing at least one of said tokens with one of the prefix and the suffix of the entries of the tree-based dictionary,
    matching at least one of said tokens with an entry of a tree-based dictionary comprising an identifier and
    annotating said token of said data structure with said identifier.

21. The method of claim 20, wherein the token belongs to a hierarchical semantic system, said method comprising the step:

annotating said token with a reference referring to information related to the relationship of said token to at least one other token of said semantic system.

22. The method of claim 20, wherein multiple identifiers are assigned in case of multiple matches.

23. A computer program product or computer system for executing the method of claim 20.

24. A method for searching a data structure including tokens, comprising the steps:

receiving multiple data elements to be stored from an input data structure, providing a continuous array in memory, allocating memory space within said continuous array for said data elements, wherein said continuous array is distributed over primary and secondary memory, storing said data elements in said allocated memory space, creating a tree-based dictionary from said data elements received from said input data structure, comprising the steps of:

associating an identifier with at least a subset of said data elements, storing each data element with an identifier in a tree within said continuous array, wherein one of common prefixes and common suffixes of said elements correspond to entries of said tree, searching the data structure by means of the dictionary which includes tokens by comparing at least one of said tokens with one of the prefix and the suffix of the entries of the tree-based dictionary, matching at least one of said tokens with an entry of a tree-based dictionary comprising an identifier, annotating tokens in said data structure, converting a query term to an identifier comprised in the dictionary, and searching said identifier within said data structure.

25. A computer program product or computer system for executing the method of claim 24.

\* \* \* \* \*